United States Patent [19]

Devic

[11] Patent Number: 5,094,866
[45] Date of Patent: Mar. 10, 1992

[54] BLEACHING OF VEGETABLE PULPS

[75] Inventor: Michel Devic, Sainte-Foy-les-Lyon, France

[73] Assignee: Atochem, Puteaux, France

[21] Appl. No.: 533,516

[22] Filed: Jun. 5, 1990

[30] Foreign Application Priority Data

Jun. 5, 1989 [FR] France .................. 89 07624

[51] Int. Cl.$^5$ .................................. A23L 1/27
[52] U.S. Cl. .......................... 426/258; 426/261; 426/255
[58] Field of Search ............ 426/253, 254, 258, 261, 426/658, 804

[56] References Cited

U.S. PATENT DOCUMENTS

| | | | |
|---|---|---|---|
| 2,478,043 | 8/1949 | Evans | 426/253 |
| 2,777,749 | 1/1957 | Young | 426/261 |
| 4,241,093 | 12/1980 | Farag et al. | 426/258 |

FOREIGN PATENT DOCUMENTS

| | | |
|---|---|---|
| 2709965 | 9/1978 | Fed. Rep. of Germany . |
| 2906528 | 9/1980 | Fed. Rep. of Germany . |
| 0072852 | 6/1978 | Japan ............ 426/261 |
| 491607 | 7/1970 | Sweden . |
| 1555657 | 11/1979 | United Kingdom . |

OTHER PUBLICATIONS

Patent Abstracts of Japan, vol. 12, No. 50 (C-476)(2897), Feb. 16, 1988, "Method for Stabilizing Hydrogen Peroxide Solution", JP-A-62-197304 (Nippon Peroxide Co. Ltd.), 1987.

*Primary Examiner*—Jeanette Hunter
*Attorney, Agent, or Firm*—Burns, Doane, Swecker & Mathis

[57] ABSTRACT

Extracted vegetable pulps are bleached to a high degree of whiteness, thus rendering them more attractive as food supplements, by (a) treating such pulp in an acid medium at a pH of up to 2.5 and for a period of time of at least 10 minutes, (b) next washing the pulp thus treated to an efficiency of at least 80%, and (c) then reacting the washed pulp with an aqueous alkaline solution of hydrogen peroxide, in the presence of an $H_2O_2$ stabilizer.

21 Claims, No Drawings

BLEACHING OF VEGETABLE PULPS

BACKGROUND OF THE INVENTION

1. Field of the Invention

The present invention relates to the preparation of bleached vegetable pulps, more especially vegetable pulps destined for nutritional use, by bleaching same with hydrogen peroxide in an aqueous alkaline solution.

By "vegetable pulps" are intended the pulps of beets, sugar beets and others, citrus fruits and fruits such as peaches, pears, apples, apricots, oleaginous plants, such as sunflowers, cereals, such as wheat, corn or oats, legumes, such as garden peas, etc., remaining after the primary desired product, such as sugar, fruit juice, pectin, oil, starch, flour, has been extracted therefrom by any known means, e.g., by water-extraction.

These pulps, designated the extracted pulps, which constitute the basic vegetable material processed according to the present invention, shall hereinafter sometimes be referred to simply as "pulps", without any further definition.

They are characterized by a high food fiber content, as determined by the enzymatic method well known to this art.

2. Description of the Prior Art

The vegetable pulps have heretofore been used for the preparation of food supplements and products, for example cereals. But the commercial success of such products has unfortunately been hindered by the excessive coloration thereof.

To alleviate this problem, it has been proposed to this art to bleach such pulps by treating them with hydrogen peroxide in an aqueous alkaline solution, for example as described in U.S. Pat. No. 4,241,093. However, even if the treatment with the hydrogen peroxide is preceded by a washing of the pulp in an acid medium using a decolorizing agent, such as sulfur dioxide, this results in merely lightening the pulp, for example from gray to yellow in the case of beet pulps, as indicated in FR 2,382,866.

SUMMARY OF THE INVENTION

Accordingly, a major object of the present invention is the provision of an improved process for the true bleaching of vegetable pulps to a very high degree of whiteness vis-a-vis the degree of whiteness attained employing those techniques heretofore known to this art.

Briefly, the present invention features the bleaching of extracted vegetable pulps with hydrogen peroxide in an aqueous alkaline solution, wherein the pulps are treated in an acid medium prior to being subjected to the action of the hydrogen peroxide, and further wherein, successively and cumulatively:

(a) the pulp is treated in the acid medium at a pH equal to or less than approximately 2.5;
(b) the duration of the treatment of the pulp in the acid medium is equal to or greater than about 10 min;
(c) the pulp treated in the acid medium is washed to an effectiveness equal to or greater than 80%; and
(d) the pulp thus washed is subjected to the action of hydrogen peroxide in the presence of a stabilizing agent for said peroxide.

DETAILED DESCRIPTION OF THE PREFERRED EMBODIMENTS OF THE INVENTION

More particularly according to the present invention, the pulp is used in the form of an aqueous suspension of the vegetable matter, at a more or less high consistency.

By "consistency" is intended the dry solids concentration of the vegetable matter expressed in percent by weight.

To advantageously carry out the process of the invention:

(i) the consistency of the pulp in the acid treatment typically ranges from 2% to 30%;
(ii) the acid treatment is conducted at a temperature, the maximum value of which depends essentially on the thermal stability of the pulp being processed; it most typically ranges from 20° to 100° C., and preferably is equal to or is less than approximately 60° C.;
(iii) the pH over the course of the acid treatment is adjusted by the addition to the pulp of an inorganic or organic acid, advantageously hydrochloric acid, phosphoric acid, sulfuric acid, sulfurous acid, acetic acid, hydrofluoric acid, or a mixture of such acids;
(iv) the duration of the treatment in the acid medium depends on the selection of the other parameters of the process, but it is typically less than about 1 hour;
(v) the apparatus employed for conducting the treatment in the acid medium may be a mixer of a conventional type, or a mixer/disperser in which the peripheral scraping agitation is slow and the central agitation, inverted relative to the peripheral agitation, is rapid. Such apparatus is commercially available, for example from the French company CELLIER. The treatment in the acid medium may be divided into two stages, in one of which the pulp and the acid are vigorously intimately admixed in a system comprising one or more helical screws to provide a high pressure and another stage of retention, either with or without agitation.

The first stage may be carried out, for example, in a high density mixer commonly used in the paper industry, or in a machine consisting essentially of two helical surfaces penetrating each other, wound around parallel shafts, rotated synchronously in the same direction within a housing therefor and defining, from top to bottom in the direction of the advance of the material, a succession of zones of entrainment and retention of the material, described for example in FR 2,319,737, 2,418,295, 2,451,963 and the Certificate of Addition FR 2,436,844, marketed for example by the French company CLEXTRAL under the trademark "BI-VIS". The duration of said first stage is typically less than 1 min;

(vi) the washing is typically carried out with water, at a temperature preferably ranging from 20° to 60° C.

By "washing" is intended the operation of eliminating a certain percentage of the liquid phase present in the pulp prior to washing. The efficiency of the washing is expressed by this percentage. It is preferably equal to or higher than 90%.

Such washing characteristically entails a repeated sequence of dilution and drainage of the pulp, most typically by filtration or pressing. Apparatus of the "BI-VIS" type, such as described above, is well suited for this operation.

The agent used to stabilize the hydrogen peroxide is most advantageously sodium silicate, magnesium in the form of magnesia or a soluble salt thereof, such as the chloride or sulfate.

All other stabilizers for hydrogen peroxide in an alkaline medium compatible with foodstuff applications, are also suitable.

The sodium silicate is conveniently used in the form of an aqueous solution having a density of 1.33. The amount of this solution is expressed whenever reference is hereinafter made to sodium silicate. The amount of sodium silicate is expressed, as is that of all reagents, in percent by weight relative to the dry solids content as the vegetable matter. It typically ranges from about 0.5% to 6% by weight preferably from 2% to 4%.

The magnesium is employed in a proportion of approximately 0.25% to 1%.

During the action of the hydrogen peroxide on the washed pulp, its consistency advantageously ranges from about 5% to 30% and preferably is equal to or higher than 10%, and the temperature of this operation advantageously ranges from about 20° to 90° C., and preferably is equal to or greater than 60° C. The duration of the action typically ranges from a few minutes to several hours, depending on temperature. It is, for example, on the order of 2 hours, if the temperature selected (in the case of beet pulp) is about 60° C.

The above description relative to the treatment in the acid medium concerning the apparatus and the option of dividing the operation into two stages, is equally applicable to the phase of the treatment with hydrogen peroxide. The retention time required may be attained in one bleaching cycle, as is known to the paper industry.

The hydrogen peroxide is typically used in a proportion of approximately 1% to 10%, preferably 5% or less.

The alkaline agent typically added to the hydrogen peroxide is sodium hydroxide, usually in an amount ranging from approximately 2% to 5%. For purposes of illustration, the pH after the treatment with the hydrogen peroxide is typically less than 8.5 for most pulps.

Schematically, the process of the invention may be carried out, for example, in an assembly comprising the following succession of the following principal apparatus: a first machine of the "BI-VIS" type, in which the pulp is mixed with the acid under the conditions of the treatment in the acid medium, a retention vessel, a second machine of the "BI-VIS" type, in which successively are effected the washing of the pulp treated in the acid medium and the contacting of the washed pulp with hydrogen peroxide and the coreagents therefor under the conditions of the action of hydrogen peroxide, and a retention vessel.

The initial pulp, prior to the treatment in the acid medium, may advantageously be washed with water to strip it of extraneous materials, such as sand.

After having been subjected to the action of hydrogen peroxide, the pulp is preferably adjusted to a pH of from 5 to 6 by means of an acid agent, such as sulfur dioxide in aqueous solution, thus improving its shelf-life and storage stability, then washed and dried prior to use.

In order to further illustrate the present invention and the advantages thereof, the following specific examples are given, it being understood that same are intended only as illustrative and in nowise limitative.

EXAMPLE 1

A sugar beet pulp, from which the sugar had been extracted and which was in a state of aqueous suspension at a pH of 6, having a consistency of 5% and containing a dry solids content of 10 kg of vegetable matter, was adjusted to pH 2 by the addition of 540 g of 96% by weight sulfuric acid thereto, and agitated at this pH for 20 min at a temperature of 35° C. prior to being filtered and washed with water on a vibrating screen, with a washing efficiency of 90%.

The pulp washed in this manner and recovered from the filter was adjusted to a consistency of 10% to be subjected, under agitation, to the action of 0.715 kg of an aqueous solution of 70% by weight hydrogen peroxide, 1 kg of an aqueous solution of 20% sodium hydroxide and 0.4 kg of sodium silicate, for 2 hours at 60° C.

The pH of the pulp after 2 hours was 6.8.

The pulp was then adjusted to pH 6 with sulfur dioxide in aqueous solution, then filtered, washed and dried. After grinding, grains were obtained having a particle size less than 100 μm, flour white in appearance, in an amount by weight corresponding to more than 80% by weight of the initial pulp in the dry state.

The degree of whiteness of this flour, measured on sintered tablets, in ISO whiteness degrees according to the ISO standard of the paper industry, was equal to 41.5° ISO, while the initial pulp had a degree of whiteness, measured under the same conditions, of only 34° ISO.

EXAMPLE 2

A pulp or spent wash of corn, the residue of corn after the extraction of starch therefrom, having a consistency of 9.8% and containing 7.9 kg dry solids of vegetable matter, was adjusted to a pH of 2.1 by the addition to the pulp of 274 g of 96% sulfuric acid, then agitated at this pH for 30 min at 30° C., prior to being washed at an efficiency higher than 90%, then subjected under agitation to the action of 0.63 kg of a 70% aqueous solution of hydrogen peroxide, 0.88 kg of a 20% aqueous solution of sodium hydroxide and 0.352 kg sodium silicate, for 2 hours at 60° C. After these 2 hours, the pH was 7.5.

The process was continued in a manner similar to that described for the beet pulp in Example 1 and the bleached corn pulp ultimately obtained had a degree of whiteness of 43° ISO; the beginning pulp had a degree of whiteness of only 30° ISO.

EXAMPLE 3

The procedure of Example 1 was repeated, using the same beet pulp and following the same process, except that the pH adjustment in the acid medium was with hydrochloric acid in place of sulfuric acid, its consistency was 2% instead of 5% and an amount of sodium hydroxide of 3% was used in place of 2% during the treatment with the hydrogen peroxide. The degree of whiteness of the bleached pulp, measured as in Example 1, was equal to 46° ISO.

By operating as above, but omitting the treatment in the acid medium, the degree of whiteness was only 38° ISO and the flour obtained was yellow.

EXAMPLE 4

The procedure of Example 3 was repeated, but substituting sulfur dioxide for hydrochloric acid to adjust the pH to 2 instead of 2.2 during the treatment in the acid medium. The degree of whiteness of the bleached pulp, measured under the conditions of the other examples, was equal to 45° ISO.

EXAMPLE 5

The procedure of Example 1 was repeated, but with a beet pulp having an initial degree of whiteness of 37° ISO, carrying out the treatment of the pulp in the acid medium at a consistency of 2% and by reacting the pulp with 10% hydrogen peroxide considered as 100% and with 4% sodium hydroxide considered as 100%. The pH after the treatment with the hydrogen peroxide was equal to 7.6, and a bleached pulp having a degree of whiteness of 53° ISO was obtained, while only 44% of the hydrogen peroxide was consumed.

The weight of the bleached dry material was equal to 80% of the initial vegetable matter in the dry state.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the bleaching of a vegetable pulp, comprising (a) treating an extracted vegetable pulp in an acid medium at a pH of up to 2.5 and for a period of time of at least 10 minutes, (b) next washing the pulp thus treated to an efficiency of at least 80%, and (c) then reacting the washed pulp with an aqueous alkaline solution of hydrogen peroxide, in the presence of an $H_2O_2$ stabilizer.

2. The process as defined by claim 1, wherein the consistency of said pulp during the acid treatment (a) ranges from 2% to 30%.

3. The process as defined by claim 1, wherein the acid treatment (a) is carried out at a temperature ranging from 20° to 100° C.

4. The process as defined by claim 3, wherein the acid treatment (a) is carried out at a temperature of up to 60° C.

5. The process as defined by claim 1, said acid treatment medium comprising an inorganic or organic acid, or mixture of such acids.

6. The process as defined by claim 5, said acid or acids comprising hydrochloric, phosphoric, sulfuric, sulfurous, acetic or hydrofluoric acid.

7. The process as defined by claim 1, wherein said washing (b) is with water and is carried out at a temperature ranging from 20° to 60° C.

8. The process as defined by claim 1, said $H_2O_2$ stabilizer comprising sodium silicate, magnesia, or a soluble salt of magnesium.

9. The process as defined by claim 8, said $H_2O_2$ stabilizer comprising sodium silicate, and said silicate being present in an amount ranging from 0.5% to 6% by weight thereof.

10. The process as defined by claim 9, said silicate being present in an amount ranging from 2% to 4% by weight thereof.

11. The process as defined by claim 8, said $H_2O_2$ stabilizer comprising magnesia or a soluble salt of magnesium, such magnesium compound being present in an amount ranging from 0.25% to 1% by weight thereof.

12. The process as defined by claim 1, wherein the consistency of the washed pulp during the hydrogen peroxide treatment (c) ranges from 5% to 30%, said $H_2O_2$ treatment (c) being carried out at a temperature ranging from 20° to 90° C. with an amount of $H_2O_2$ ranging from 1% to 10% by weight.

13. The process as defined by claim 12, wherein the hydrogen peroxide treatment (c) is carried out in the presence of 2% to 5% by weight of an alkaline reagent.

14. The process as defined by claim 13, said alkaline reagent comprising sodium hydroxide.

15. The process as defined by claim 13, said consistency being at least 10%, said temperature being at least 60° C. and the amount of $H_2O_2$ being no greater than 5%.

16. The process as defined by claim 1, said extracted vegetable pulp comprising an aqueous suspension of vegetable solids.

17. The process as defined by claim 1, wherein the acid treatment (a) is carried out for less than about 1 hour.

18. The process as defined by claim 1, wherein the acid treatment (a) is carried out in a mixing apparatus.

19. The process as defined by claim 1, further comprising adjusting the pH of the $H_2O_2$-treated pulp to a value ranging from 5 to 6.

20. The product of the process as defined by claim 1.

21. A food supplement comprising the product of the process as defined by claim 1.

* * * * *